Patented Feb. 24, 1948

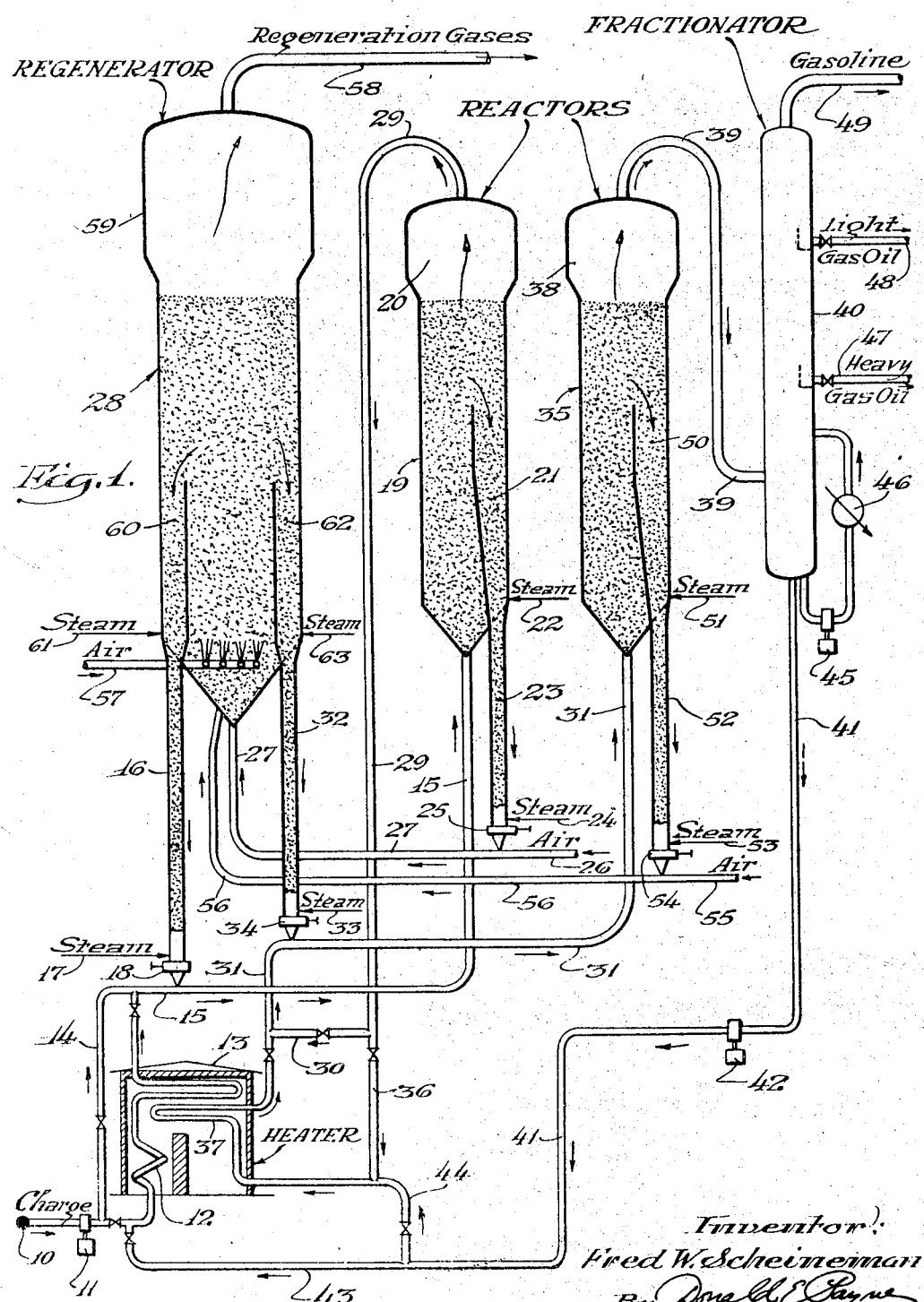

2,436,486

UNITED STATES PATENT OFFICE 2,436,486

MULTISTAGE HYDROCARBON CRACKING PROCESS

Fred W. Scheineman, Chicago, Ill., assignor to Standard Oil Company, Chicago, Ill., a corporation of Indiana Application February 27, 1942, Serial No. 432,547

2 Claims. (Cl. 196—49)

This invention relates to multi-stage hydrocarbon conversion systems and it pertains more particularly to a two-stage system for the manufacture of high octane number motor fuels from hydrocarbon charging stocks by means of a fluid-type catalytic conversion system. This application is a continuation-in-part of my copending application Serial No. 400,956, filed July 3, 1941.

A fluid-type catalytic conversion system is one in which a powdered catalyst effects conversion while suspended in a gas or vapor stream. The catalyst is then separated from reaction gases or vapors, stripped with an inert gas such as steam, and suspended in a gas mixture for regeneration. The regenerated catalyst is then separated from regeneration gases and resuspended in a gas or vapor stream for effecting further conversion. My invention relates to improvements in this fluid-type catalytic conversion system wherein the powdered catalyst effects conversion in two separate zones under very different operating conditions.

The activity of catalysts for effecting various types of conversion depends on a number of factors including the type of catalyst employed, the relative freshness of the catalyst or amount of carbonaceous material deposited thereon, the temperature of the conversion, etc. When a catalyst becomes excessively coated with carbonaceous material on initial contact with the charging stock it may no longer possess the activity required for effecting the desired conversion. The optimum temperature for the initial stages of the conversion may be very different than the temperatures required for the final stages in the production of high octane number motor fuels. The optimum catalyst-to-oil ratio for the initial stages of the conversion may likewise be very different from the optimum catalyst-to-oil ratio for the final stages. An object of my invention is to provide a unitary fluid-type system wherein a catalytic conversion may be effected in stages so that the catalyst-to-oil ratio catalyst holding time, weight space velocity, temperature, etc. in each stage may be controlled entirely independently of the control in the other stage or stages.

A further object of my invention is to provide a fluid-type catalytic conversion system wherein there is a lower percent of carbon on the catalyst in the secondary stage than can possibly be maintained in the single reactor systems heretofore employed. A further object is to maintain a substantially optimum carbonaceous deposit on the catalyst throughout the entire cracking range.

A further object is to provide a fluid-type catalytic conversion system which will be characterized by greater flexibility of operating conditions (such as temperature, pressure, catalyst-to-oil ratios, catalyst residence time, space velocities, etc.) than has heretofore been possible in any conversion system of this type.

A further object is to provide a system wherein a liquid or only partially vaporized charging stock may be vaporized and partially cracked in a primary conversion stage with a very high catalyst-to-oil ratio and with a short time of contact and wherein the vapors from this first stage may be cracked in the second stage at a lower catalyst-to-oil ratio with active catalyst to obtain a motor fuel of the desired characteristics.

Other objects of the invention will be apparent as the detailed description proceeds.

A feature of my invention is the use of a single regenerator with a plurality of conversion stages, the catalyst flow being from the regeneration zone to each stage and thence back to the regeneration zone and the charging stock flow being in series through the two or more stages. When employing an unvaporized or only partially vaporized gas oil or residual oil charging stock, I may employ a very high catalyst-to-oil ratio, i. e., a catalyst-to-oil weight ratio within the approximate range of 5 to 25, in the first stage for effecting substantially complete vaporization and initial cracking and I may then conduct the vapors from this first stage to a second stage wherein the catalyst-to-oil weight ratio is relatively low, i. e., within the approximate range of 1 to 4. The catalyst holding time in the first stage may be very short, i. e., about one minute or less, while in the second stage it may be relatively long, i. e., about 3 to 10 minutes or more. While considerable carbonaceous material will be formed in the first stage the high catalyst-to-oil ratio will prevent the carbon deposit on the catalyst from exceeding about 4 or 5% by weight based on catalyst and in the second stage, even with the longer catalyst holding time, the carbon deposit on the catalyst will be substantially less than 5% and it may be only about 1 to 3%. By this multi-stage process the catalyst is used more effectively in each stage, excessive carbonaceous deposits are prevented, and consequently larger yields of high octane number gasoline is obtainable.

Where a gasoline of maximum clear octane number is desired the second stage may be at a higher temperature than the first stage. When a gasoline of maximum leaded octane number is desired the treating temperature in the second stage may be lower than that of the first stage.

The extent and character of the conversion is, however, dependent upon the activity of the catalyst and other operating conditions such as weight space velocity, catalyst-to-oil weight ratio, catalyst residence time, etc. so that temperature is not the sole factor which requires consideration. Nevertheless, temperature control is extremely important and a feature of my invention is the improved method and means for controlling the temperature in at least one of said conversion zones by regulating the amounts of relatively hot and relatively cool regenerated catalyst introduced thereto.

The invention will be more clearly understood from the following detailed description of specific examples read in conjunction with the accompanying drawings which form a part of this specification and in which:

Figure 1 is a schematic flow diagram of my improved multi-stage conversion system wherein both stages are operated at relatively high temperature, and Figure 2 is a schematic flow diagram of a multi-stage system wherein the second stage operates at a lower temperature than the first stage.

For catalytic cracking, I prefer to employ catalyst of the silica-alumina type. One example of such catalyst is acid treated montmorillonite clay commonly marketed as Super Filtrol. Another example is a synthetic catalyst consisting essentially of activated silica with alumina either with or without additional metal oxides or fluosilicates. Such a catalyst may be prepared by ball milling silica hydrogel with alumina using about 2 to 30%, for example about 15%, of alumina. The ball milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is boiled for an hour or two with an excess of ammonium hydroxide solution before washing, after which it is dried and heated as in the previous example. The silica-alumina catalyst may be rendered more stable at high temperatures by the addition thereto of zirconia or aluminum fluosilicate. Thoria, beryllium oxide or other metal oxides may also be included in the composition. My invention is not limited to the use of any particular catalyst and since no invention is claimed in the catalyst per se a further description thereof is unnecessary.

In these specific examples the catalyst is in powdered form with a particle size of about 10 to 100 microns. The invention is applicable to other catalyst sizes provided only that the catalyst be of such size and density that it may be aerated and handled as a fluid in the manner herein described. The bulk density of such catalyst which has settled for 5 or 10 minutes will usually range from 30 to 45 pounds per cubic foot. With slight aeration, i. e., with gas or vapor velocities of about .05 to .5 feet per second, the bulk density of this catalyst is about 25 to 35 pounds per cubic foot and under such conditions the catalyst is referred to as "aerated catalyst." With vapor velocities of about 1 to 2 or 3 feet per second the bulk density of such catalyst may be from 10 to 25 pounds per cubic foot. It is at such gas or vapor velocities that the powdered catalyst is maintained in the dense turbulent suspended catalyst phase which has been found most satisfactory for effecting cracking, treating and regeneration. With higher and higher vapor velocities the bulk density becomes less and less. In zones above the level of dense phase catalyst in cracking, treating or regeneration zones, the average bulk density of catalyst is usually less than 1 pound per cubic foot and at such conditions the catalyst is said to be in the dilute, light or dispersed phase. This dilute phase may contain only about 50 grains or less of catalyst material per cubic foot.

In connection with Figure 1, I will describe the catalytic cracking of a heavy gas oil or reduced crude to produce high yields of a motor fuel of high clear octane number. It should be understood, of course, that the invention is not limited to any particular type of charging stock and that instead of a virgin stock I may employ one which has undergone or been produced in a previous thermal or catalytic conversion. Also, I may employ hydrocarbons produced by the hydrogenation of carbonaceous materials or by the synthesis of carbon monoxide with hydrogen (the so-called Fischer process) or by any other means.

This charging stock may be passed from source 10 by pump 11 through coils 12 of pipe still 13, or it may be passed directly through line 14 to transfer line 15. Hot regenerated catalyst from standpipe 16 which is aerated by steam introduced through line 17, is introduced by means of valve 18 into transfer line 15. The catalyst in standpipe 16 may be at a temperature in the general vicinity of 1000° F. and 5 to 25 parts by weight, for example about 15 parts by weight, of this catalyst may be introduced into line 15 for each part by weight of charging stock which is introduced thereto. Heavy charging stocks such as reduced crude, as is well known, cannot be completely vaporized without decomposition. If the charging stock is not completely vaporized when it meets this hot catalyst the contained heat of the catalyst immediately effects complete vaporization and the catalyst is carried by the charging stock vapors through transfer line 15 to reaction chamber 19, which may be an enlarged part of line 15 itself but which is preferably a vertical cylindrical vessel provided with an enlarged upper section 20. The reactor may be of such dimensions as to provide a vertical gas velocity therein within the approximate range of about 1 to 3 feet per second so that the suspended catalyst therein is in turbulent dense phase condition. Considerable amounts of steam may be introduced with the charging stock or for injecting powdered catalyst into the transfer line or reactor. The temperature in the reactor may be within the approximate range of 750 to 950° F., for example about 850° F., and the pressure may be within the approximate range of atmospheric to about 50 pounds per square inch, for example about 10 pounds per square inch. This reactor should be of relatively small size so that the catalyst residence time in the reactor will be less than one minute, for example in the general vicinity of 30 seconds. The space velocity will be relatively high, i. e., within the approximate range of 5 to 50 parts by weight of charging stock per hour charged to the reactor per part by weight of catalyst in the reactor at any instant. The actual time of contact of the charging stock with the catalyst will thus be very short and over cracking will be prevented in spite of the severity of the operating conditions.

Catalyst may be withdrawn directly from the dense turbulent phase through stripper column 21 at the base of which steam is introduced through line 22. The catalyst then passes through standpipe 23 which is aerated by steam introduced through line 24. It is discharged from the base of the standpipe through valve 25, picked up with air introduced through line 26 and conveyed by line 27 to regenerator 28.

The bulk of the catalyst usually more than 95% thereof, settles out of the vapors in the enlarged upper section 20 so that substantially catalyst-free gases and vapors are withdrawn from the top of reactor 19 through line 29. These gases and vapors may be passed through lines 30 and 31 for picking up hot fresh regenerated catalyst from the base of standpipe 32. The catalyst in this standpipe is aerated by steam from line 33. The amount of catalyst introduced into line 31 may be controlled by valve 34 and in this particular example I may employ a catalyst-to-oil weight ratio of about 1:1 to 4:1, for example about 3:1. Since the catalyst in the standpipe is at a temperature within the general vicinity of 1000° F. the suspended catalyst which is introduced by line 31 into reactor 35 may be at a temperature of about 800 to 1000° F., for example about 900° F. If desired I may pass the gases and vapors through line 36 and heating coil 37 before introducing them into line 31 for picking up hot regenerated catalyst from line 32.

Operating conditions in reactor 35 may be very different from those prevailing in reactor 19. The catalyst residence time in this reactor may be from about 2 to 30 minutes or more, for example about 10 minutes. The space velocity is preferably within the approximate range of about 1 to 4 pounds of oil introduced per hour per pound of catalyst material in the reactor at any instant. The pressure in reactor 35 may be substantially the same as that in reactor 19. Since the carbon deposition in reactor 35 is very much less than in reactor 19 (even at the higher temperature) the catalyst residence time may be considerably longer and the space velocity considerably lower than in the primary conversion stage. Under the conditions prevailing in reactor 35 a gasoline of very high octane number is produced and yields may be about 40 or 50% based on initial charging stock.

Catalyst settles from reaction products in the enlarged upper portion 38 of reactor 35 and if necessary or desirable I may employ cyclone separators or other separation means for limiting the amount of catalyst which is carried overhead with gases and vapors through line 39. The reaction products are then introduced into fractionating column 40 and any residual catalyst material is scrubbed out in the lower part of this column and returned with heavy condensate by line 41 and pump 42 either through line 43 to heating coils 12 or through line 44 to heating coils 37. A portion of the heavy condensate from the bottom of the column may be recycled by pump 45 through cooler 46 to a point in the tower above the vapor inlet in order to effect the necessary cooling and scrubbing in the base of tower 40. Heavy gas oils may be withdrawn through line 47 and light gas oils through line 48. Gasoline and gases are taken overhead through line 49 to a conventional system for separating water and for fractionating the hydrocarbons into a gasoline fraction, a butane-butylene fraction and a gas fraction. It should be understood that these products may be fractionated in any known manner to separate products of desired boiling range but since this fractionation system per se forms no part of my invention it will not be described in further detail.

Catalyst is withdrawn directly from the dense turbulent suspended catalyst phase in reactor 35 through stripping section 50 at the base of which steam is introduced through line 51. This catalyst then passes through standpipe 52 which is aerated by steam introduced through line 53, it is discharged from the base of the standpipe in amounts regulated by valve 54, picked up by air introduced through line 55 and returned by line 56 back to regenerator 28. The regenerator is considerably larger than the reactors, i. e., it may have a volume five or ten times that of conversion chamber 35. Air may be introduced into the base of the regenerator through line 57 in such amounts that the vertical gas velocity in the reactor is within the approximate range of about 1 to 3 feet per second so that turbulent dense phase conditions will prevail throughout the main part of the regeneration zone. If necessary or desirable suitable cooling coils may be installed in the regenerator or catalyst may be withdrawn, passed through a cooler and then returned to the regenerator for obtaining necessary temperature control. For catalyst of the silica-alumina type the regenerator temperatures are generally held below 1050° F. although certain catalysts may safely withstand higher regeneration temperatures.

Regeneration gases are withdrawn from the top of the regenerator through line 58. If necessary or desirable cyclone separators may be employed to prevent catalyst material from being taken overhead with regeneration gases but the enlarged settling zone at the top of the regenerator minimizes any tendency for catalyst to be taken overhead. Any residual catalyst material in the regeneration gases may be recovered by means of electrostatic precipitators or may be scrubbed or filtered out of the gases in any known manner. The heat energy in these gases may be utilized for generating steam or driving a turbine or may be utilized in any other known manner.

One portion of the regenerated catalyst passes through stripping section 60, is stripped with steam from line 61, and is then passed through standpipe 16 for introduction into primary reactor 19. Another portion of the regenerated catalyst is removed through stripping section 62, stripped with steam introduced through line 63 and passes through standpipe 32 for introduction into the secondary reactor 35. The relative amounts of catalyst introduced into the primary and secondary reactors is determined by the position of valves 18 and 34 respectively. Thus a high catalyst-to-oil ratio may be employed in the primary reactor 19 while a relatively low catalyst-to-oil ratio is employed in reactor 35. The average amount of carbonaceous deposit on catalyst in reactor 35 will be substantially less than the average carbonaceous deposits on reactor 19 and the products which leave reactor 19 are materially improved in octane number by their subsequent passage through reactor 35.

While I have described a preferred type of reactor it should be understood that my invention is not limited to any particular reactor design. Catalyst may be withdrawn from the base of the reactor or regenerator instead of from an intermediate point in the dense catalyst phase or it may be withdrawn from the upper dense phase level. In fact, the primary reactor may be of the type illustrated in Belchetz U. S. Patent No. 2,253,486 and the reactors, regenerators and catalyst transfer means may be of the type described in my copending applications.

In connection with Figure 2, I will describe a system for the production of aviation gasoline of low acid heat from a charging stock of the heavy naphtha to light gas oil boiling range. In this case the charging stock from source 10 is passed by pump 11 through coils 12 of pipe still 13 or directly introduced through line 14 to transfer line 15 where it picks up regenerated catalyst from standpipe 16 as in the previous example. The catalyst-to-oil weight ratio entering reactor 19a as a stream may be in the general vicinity of 5:1 and the temperature of the entering stream may be about 750 to 950° F., for example about 850° F. The weight space velocity in primary reactor 19a may be within the general vicinity of 2 or 3 pounds of charging stock per hour per pound of catalyst in this reactor and the residence time of the catalyst in the reactor may be in the general vicinity of about 5 minutes. Catalyst is withdrawn from this reactor directly from the dense phase and returned to the regenerator in the manner hereinabove described in connection with Figure 1.

In the production of aviation fuel where a high leaded octane number is desirable the second stage may be at a lower temperature than the first stage and since freshly regenerated catalyst is desired in this second stage this catalyst must be cooled before it is suspended in the gases or vapors leaving the first stage. Thus instead of introducing catalyst directly from the base of standpipe 32a into a hydrocarbon stream I may pick up this catalyst with air introduced through line 64 and convey the catalyst through tubes of cooler 65. Water or other fluid may be introduced around the tubes through line 66 and steam or other hot fluids may be withdrawn through line 67. The cooled catalyst may then be introduced through line 68 to cyclone separator 69 and the separated catalyst may be withdrawn through standpipe 70 which is aerated by steam introduced through line 71, the aeration steam serving to strip the oxygen out of the separated catalyst. This separated cooled catalyst is then introduced directly into reactor 35a in amounts controlled by valve 72. Reactor 35a may be superimposed directly over reactor 19a so that gases and vapors may pass directly through a suitable grating or distributing member 73 from the primary to the secondary reactor.

The catalyst-to-oil weight ratio in reactor 35a may vary throughout a relatively wide range, i. e., may be within the approximate range of 1 to 10 and will depend somewhat upon the catalyst-to-oil ratio employed in the first reactor 19a. The catalyst-to-oil weight ratio in these two stages may be within the general vicinity of 5 or in the approximate vicinity of 1 to 10. The overall weight space velocity may be about ½ to 2 pounds or more per pound of charging stock per hour per pound of catalyst in the combined conversion zones at any instant. The catalyst residence time in secondary reactor 35a may likewise vary throughout a relatively wide range, i. e., from a minute or less to upwards of 10 minutes. The temperature in the secondary stage may be within the approximate range of 550 to 750° F., for example about 650° F.

The relatively cool catalyst leaving reactor 35a through standpipe 52a will absorb a considerable amount of the heat of regeneration and thus facilitate temperature control. The gases and residual catalyst from cyclone separator 69 may be returned to the regenerator through line 74 and if desired a portion of the cooled catalyst may be returned therewith through line 75. It should be understood that catalyst cooler of the type illustrated by cooler 65 may be employed in the system hereinabove described in connection with Figure 1 and that a part of the cooled catalyst may be introduced into either of the conversion zones 19 or 35 in order to obtain the desired catalyst-to-oil ratios therein without exceeding desired operating temperatures.

While I have described in detail certain specific examples of my invention it should be understood that these examples are by way of illustration and not limitation. Numerous other modifications and alternative procedures will be apparent to those skilled in the art from the above description.

I claim:

1. The method of operating a catalytic cracking process employing finely divided solid catalyst particles in a regeneration zone and two conversion zones which method comprises maintaining a dense turbulent catalyst phase superimposed by a dilute catalyst phase in the regeneration zone by passing regeneration gases upward in said zone at a low velocity, withdrawing hot catalyst directly from the dense turbulent catalyst phase in the regeneration zone to a first conversion zone, introducing a high boiling hydrocarbon charging stock at a low point in said first conversion zone at such a rate as to maintain a dense turbulent catalyst phase therein, effecting only partial cracking in said first conversion zone and employing a short catalyst residence time therein, withdrawing catalyst directly from the dense turbulent catalyst phase in the first conversion zone and returning it to the regeneration zone, removing conversion products from an upper part of the first conversion zone, withdrawing catalyst directly from the dense turbulent catalyst phase in the regeneration zone, cooling said withdrawn catalyst, introducing said cooled catalyst into a second conversion zone, passing substantially all products produced in said first conversion zone to a low point in the second conversion zone at such a rate as to maintain a dense turbulent catalyst phase therein, effecting further cracking in said second conversion zone and employing a longer catalyst residence time therein than is employed in said first conversion zone, withdrawing catalyst from the dense catalyst phase in the second conversion zone and returning it to said regeneration zone, removing products from an upper part of the second conversion zone and fractionating the removed products.

2. The method of operating a catalytic conversion system employing solid cracking catalyst having a particle size of about 10 to 100 microns for effecting the production of gasoline from a charging stock that cannot be completely vaporized without decomposition, which method comprises preheating said charging stock without completely vaporizing it, contacting said preheated stock with hot regenerated catalyst in an amount and at a temperature to complete the vaporization thereof, passing charging stock vapors upwardly through a first cracking zone at a velocity in the range of 1 to 3 feet per second effective for maintaining in said first cracking zone a dense turbulent phase of catalyst superimposed by a light dispersed catalyst phase, employing conditions in said first cracking zone to effect only a partial cracking and to deposit less than 4% by weight of carbonaceous deposits on the catalyst, withdrawing a substantially catalyst-free gasiform stream from said dilute phase, withdrawing catalyst from a point below the dense phase level in the first cracking zone to a regeneration zone, suspending another portion of hot regenerated catalyst from the regeneration zone in said gasiform stream and passing said stream upwardly in a second cracking zone at a velocity in the range of 1 to 3 feet per second effective for maintaining in said second cracking zone a dense turbulent catalyst phase superimposed by a light dilute catalyst phase, maintaining said second cracking zone under conditions for effecting further cracking of components of said stream and for depositing on said catalyst less than 3% by weight of carbonaceous material, withdrawing a substantially catalyst-free product stream from the light catalyst phase in the second cracking zone, withdrawing catalyst from the second cracking zone at a point below the dense phase level therein to said regeneration zone, passing a regeneration gas upwardly in the regeneration zone at a velocity in the range of 1 to 3 feet per second effective for maintaining therein a dense turbulent catalyst phase superimposed by a light dilute catalyst phase, withdrawing substantially catalyst-free gases from said last-named dilute phase, maintaining a temperature in said regeneration zone substantially higher than that in the cracking zones whereby sensible heat is stored in the catalyst for use in said cracking zones, and withdrawing from below the dense phase level in said regeneration zone hot regenerated catalyst for introduction to said first and second cracking zones respectively.

FRED W. SCHEINEMAN.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,271,148 | Becker et al. | Jan. 27, 1942 |
| 2,277,938 | Subkow | Mar. 31, 1942 |
| 2,290,580 | Degnen et al. | July 21, 1942 |
| 2,296,722 | Marancik et al. | Sept. 22, 1942 |
| 2,303,047 | Hemminger | Nov. 24, 1942 |
| 2,304,128 | Thomas | Dec. 8, 1942 |
| 1,984,380 | Odell | Dec. 18, 1934 |
| 2,327,175 | Conn | Aug. 17, 1943 |
| 2,369,523 | Belchetz | Feb. 13, 1945 |